US006928412B2

(12) United States Patent
DeBiasse

(10) Patent No.: US 6,928,412 B2
(45) Date of Patent: Aug. 9, 2005

(54) COMPUTERIZED SYSTEM TO IMPROVE PROCESS OF BRINGING CONSUMER PRODUCT TO MARKET

(75) Inventor: Paul C. DeBiasse, 30 Keats Rd., General Delivery, Pottersville, NJ (US) 07979

(73) Assignee: Paul C. DeBiasse, Pottersville, NJ (US)

( * ) Notice: Subject to any disclaimer, the term of this patent is extended or adjusted under 35 U.S.C. 154(b) by 208 days.

(21) Appl. No.: 10/213,995

(22) Filed: Aug. 7, 2002

(65) Prior Publication Data

US 2003/0028420 A1 Feb. 6, 2003

Related U.S. Application Data

(63) Continuation of application No. 09/398,742, filed on Sep. 17, 1999, now abandoned.

(51) Int. Cl.[7] .................................................. G06F 17/60

(52) U.S. Cl. ............................... 705/7; 705/1; 709/200; 707/8; 707/200; 707/201

(58) Field of Search ........................ 705/10, 7; 709/200; 707/8, 201

(56) References Cited

U.S. PATENT DOCUMENTS 5,208,765 A * 5/1993 Turnbull ....................... 702/84
5,311,438 A * 5/1994 Sellers et al. .................. 700/96
5,523,942 A * 6/1996 Tyler et al. ..................... 705/4
5,552,995 A * 9/1996 Sebastian ...................... 700/97
5,694,551 A * 12/1997 Doyle et al. ................... 705/26
5,831,859 A * 11/1998 Medeiros et al. ........... 700/218
5,860,068 A * 1/1999 Cook ........................... 705/26
5,899,998 A * 5/1999 McGauley et al. ...... 707/104.1
5,940,835 A * 8/1999 Sit ............................. 707/102
5,962,834 A * 10/1999 Markman ................... 235/385
6,044,354 A * 3/2000 Asplen, Jr. ...................... 705/7
6,101,487 A * 8/2000 Yeung ......................... 705/410
6,138,104 A * 10/2000 Marchak et al. ............... 705/9
6,505,204 B1 * 1/2003 Fanjoy ........................ 707/100
2001/0013044 A1 * 8/2001 Haris et al. .................... 705/1

FOREIGN PATENT DOCUMENTS

JP 08106494 A * 4/1996 ........... G06F/17/60

OTHER PUBLICATIONS

Nelson, Fritz. "Notes 2.0 Flexibility Shares Information," InfoWorld, Aug. 12, 1991, [retrieved from Proquest].*

* cited by examiner

*Primary Examiner*—Tariq R. Hafiz
*Assistant Examiner*—Catherine M. Colón

(57) ABSTRACT

A data management system for use in a consumer product development process comprises a computing device with a memory having a plurality of data bases including at least one database for each of a plurality of business units involved in the product development process. An application program, for execution in the computing device, interfaces with at least one user to retrieve initial product information, to thereby produce a first product record in one of the plurality of databases. A sharing engine interacts with each of said databases to generate product records for each database using product information from said first product record, wherein each of said product records is organized by requirements from the database for which said product record is generated.

21 Claims, 13 Drawing Sheets

MARKETING BULLETIN

110 PROGRAM NAME : 15 OUNCE - 444 mL COCOA OIL/ALOE SHAMPOO

| | CODE # | MARKET | QUANTITIES | SHIP DATE | |
|---|---|---|---|---|---|
| 20 | 100200.01 | DOMESTIC | 33,000 | | |
| 20' | 100200.02 | EUROPE | 15,000 | | 90 |
| 20'' | 100200.03 | ASIA | 12,000 | | |
| 20''' | 100200.04 | CANADA | 6,000 | | |

70 BUDGET CLASSIFICATION HAIR

| | | | | | |
|---|---|---|---|---|---|
| 50 | RETAIL | $40.00 | BRAND: | | 160 |
| 40 | NET | $24.00 | SEASON: | 2H99 | 170 |
| | VALUE | N/A | | | |
| 30 | COG TARGET | $3.83 | | | |
| 60 | MINIMUM ORDER QUANTITY | 24 | | | |

DEADLINES

| | | | | | | |
|---|---|---|---|---|---|---|
| 150 | COMP 11/16/98 | | COPY 11/18/98 | | LAYOUT 11/28/98 | |
| | PHOTO 12/4/98 | | CHROME 12/6/98 | | SLIDE 12/8/98 | |

PROGRAM OBJECTIVE

120 DEVELOP A 15 OUNCE/440mL COCOA OIL/ALOE SHAMPOO FOR ADULTS

PROGRAM DETAILS

80
CUSTOM SOFT SHOULDER BOTTLE
GLOSS FINISH
CUSTOM CYLINDRICAL PLATE TOP BLUE CAP

PROGRAM PROFILE 130 3" DIAMETER X 12" TALL BOTTLE

COMMENTS

140

180 LAUNCH DATE: 3/1/2000

190 SHIPPER DETAILS: KRAFT 200 LB. X 24 w/ INT PAPER DIVIDER TEST

FIGURE 1

SALES SHEET

110 PROGRAM NAME : 15 OUNCE - 444 mL COCOA OIL/ALOE SHAMPOO

20 PROGRAM CODE : 100200.01

180 LAUNCH DATE : January 1, 2000

50 PRICE POINT : $3.83

60 ORDER QUANTITY : .24

210 SALES PROMOTIONS : SAVE 5% ON ORDERS 500+
SAVE 10% ON ORDERS 2000+

| | | 03/1999 | 04/1999 | 05/1999 | 06/1999 | 07/1999 | 08/1999 |
|---|---|---|---|---|---|---|---|
| 230 | FORECAST | 10,000 | 8,000 | 4,000 | 3,000 | 3,000 | 5,000 |
| 220 | ACTUAL | | | | | | |
| | ON-HAND | | | | | | |

90 TOTAL FORECAST : 33,000 — 90
TOTAL ACTUAL : 0

240 | CUSTOMER: | ORDER# | QTY | SHIP |

COMMENTS:

250

*APPROVALS ( REQUIRES PASSWORD)

260 ____ MARKETING
____ SALES
____ OTHER

FIGURE 2

FINANCE PROPOSAL

| | | | |
|---|---|---|---|
| 110 | PROGRAM NAME | : | 15 OUNCE - 444 mL COCOA OIL/ALOE SHAMPOO |
| 20 | PROGRAM CODE | : | 100200.01 |
| 180 | LAUNCH DATE | : | January 1, 2000 |
| 50 | PRICE POINT | : | $40.00 |

310

| DEPARTMENT | DESCRIPTION | $ | PAYBACK | C/E |
|---|---|---|---|---|
| MARKETING | PHOTO & ADVERTISING | 1,200,000.00 | 2.0 | C |
| PACKAGING | CUSTOM TOOLING FOR NEW BOTTLE CAP | 500,000.00 | 0.8 | E |
| R&D | NEW LAB SPACE | 75,000.00 | 0.4 | E |
| ENGINEERING | | 2,000,000.00 | 3.1 | |
| MANUFACT | CUSTOM EQUIPMENT PURCHASE, INSTALL, TRAIN | 725,000.00 | 1.5 | C |
| DISTRIBUTION | ADD. WAREHOUSE SPACE NEED | 100,00.00 | 1.2 | C |
| TOTAL | ------------------------------------------------ | 4,600,000.00 | 3.1 | --- |

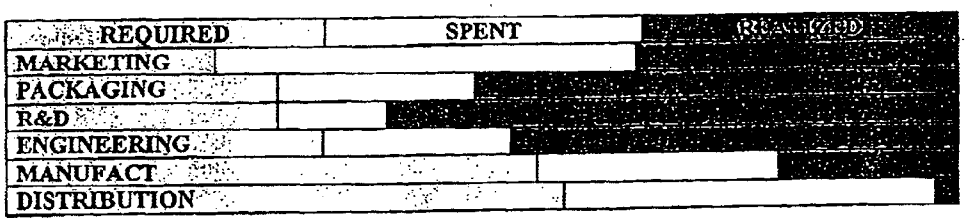

*APPROVAL W/PASSWORD

LOGISTICS ____
MARKET ____
ACCOUNT ____

FIGURE 3

ACCOUNTING LEDGERS

| | | | |
|---|---|---|---|
| 110 | PROGRAM NAME | : | 15 OUNCE - 444 mL COCOA OIL/ALOE SHAMPOO |
| 20 | PROGRAM CODE | : | 100200.01 |
| 80 | LAUNCH DATE | : | January 1, 2000 |
| 50 | PRICE POINT | : | $40.00 |

- SPREADSHEETS FOR EACH PROJECT WITHIN THE MAJOR LAUNCH

410
- ____ MARKETING
- ____ PACKAGING
- ____ R&D
- ____ ENGINEERING
- ____ DISTRIBUTION
- ____ CORPORATE SPREADSHEET

- SUMMARY OF ALL CAPITAL AND EXPENSE ITEMS

310

| DEPARTMENT | DESCRIPTION | $ | PAYBACK | C/E |
|---|---|---|---|---|
| MARKETING | PHOTO & ADVERTISING | 1,200,000.00 | 2.0 | C |
| PACKAGING | CUSTOM TOOLING FOR NEW BOTTLE CAP | 500,000.00 | 0.8 | E |
| R&D | NEW LAB SPACE | 75,000.00 | 0.4 | E |
| ENGINEERING | | 2,000,000.00 | 3.1 | |
| MANUFACT | CUSTOM EQUIPMENT PURCHASE, INSTALL, TRAIN | 725,000.00 | 1.5 | C |
| DISTRIBUTION | ADD. WAREHOUSE SPACE NEED | 100,00.00 | 1.2 | C |
| TOTAL | ---------------------------------------- | 4,600,000.00 | 3.1 | — |

[420' thru 420'''] [430' thru 430''']

FIGURE 4

RESEARCH & DEVELOPMENT

| | | |
|---|---|---|
| 110 | PROGRAM NAME : | 15 OUNCE - 444 mL COCOA OIL/ALOE SHAMPOO |
| 20 | PROGRAM CODE : | 100200.01 |
| 80 | LAUNCH DATE : | January 1, 2000 |
| 50 | PRICE POINT : | $40.00 |

510

PRODUCT RECIPE

| ID | NAME | DESCRIPTION | QTY/ UNIT | TIME LINE (MTHS) |
|---|---|---|---|---|
| 100200.01.R0001.AAAA | $H_2O$ | | .65 | 2 |
| 100200.01.R0002.AAAA | AMM. LAU. SUL | | .20 | 3 |
| 100200.01.R0003.AAAA | COCOA OIL | | .06 | 1.5 |
| 100200.01.R0004.AAAA | ALOE | | .03 | 1.7 |
| 100200.01.R0005.AAAA | SURFACTANT | | .03 | 2.8 |
| 100200.01.R0006.AAAA | VITAMIN E | | .01 | 0 |
| 100200.01.R0007.AAAA | FRAGRANCE | | .01 | 6 |
| 100200.01.R0008.AAAA | COLORANT | | .01 | 2.8 |
| ——— | ——— | TOTAL | 1.00 | 6 MOS. |

520

ESTIMATED COST OF RECIPE

| ID | NAME | QTY/ UNIT | EST COST IN QTY | EST COST/ UNIT | QUALIFIED VENDORS |
|---|---|---|---|---|---|
| 100200.01.R0001.AAAA | $H_2O$ | .65 | | | |
| 100200.01.R0002.AAAA | AMM. LAU. SUL | .20 | | | |
| 100200.01.R0003.AAAA | COCOA OIL | .06 | | | |
| 100200.01.R0004.AAAA | ALOE | .03 | | | |
| 100200.01.R0005.AAAA | SURFACTANT | .03 | | | |
| 100200.01.R0006.AAAA | VITAMIN E | .01 | | | |
| 100200.01.R0007.AAAA | FRAGRANCE | .01 | | | |
| 100200.01.R0008.AAAA | COLORANT | .01 | | | |
| —TOTAL— | ——— | | | $ | |

SPECIAL INSTRUCTIONS TO PACKAGING

530

SPECIAL INSTRUCTIONS TO SAFETY/ENVIRONMENTAL

540

AUTHORIZATIONS

FIGURE 5

PACKAGING

110 PROGRAM NAME : 15 OUNCE - 444 mL COCOA OIL/ALOE SHAMPOO

20 PROGRAM CODE : 100200.01

80 LAUNCH DATE : January 1, 2000

50 PRICE POINT : $40.00

PACKAGING COMPONENTS

610

| ID | NAME | DESCRIPTION | QTY/ UNIT | TIME LINE (MTHS) |
|---|---|---|---|---|
| 100200.01.P0001.AAAA | BOTTLE | | 1 | 6 |
| 100200.01.P0002.AAAA | CAP | | 1 | 2 |
| 100200.01.P0003.AAAA | FRONT LABEL | | 1 | 1.5 |
| 100200.01.P0003.AAAB | BACK LABEL | | 1 | 1.5 |
| 100200.01.P0004.AAAA | TAMPER EVIDENT BAND | | 1 | 0.6 |
| 100200.01.P0005.AAAA | SHIPPER | | 1 | 0 |
| 100200.01.P0006.AAAA | DIVIDER | | 0.0417 | 0 |
| 100200.01.P0003.AAAC | SHIPPER LABEL | | 0.0417 | 1.5 |
| 100200.01.P0007.AAAA | SHIPPER TAPE | | 0.0001 | 0 |
| ———— | ———TOTAL——— | | | 6 MONTHS |

ESTIMATED COST OF PACKAGING

620

| ID | NAME | QTY/ UNIT | EST COST IN QTY | EST COST/ UNIT | QUALIFIED VENDORS |
|---|---|---|---|---|---|
| 100200.01.P0001.AAAA | BOTTLE | 1 | | | |
| 100200.01.P0002.AAAA | CAP | 1 | | | |
| 100200.01.P0003.AAAA | FRONT LABEL | 1 | | | |
| 100200.01.P0003.AAAB | BACK LABEL | 1 | | | |
| 100200.01.P0004.AAAA | TAMPER EVIDENT BAND | 1 | | | |
| 100200.01.P0005.AAAA | SHIPPER | 1 | | | |
| 100200.01.P0006.AAAA | DIVIDER | 0.0417 | | | |
| 100200.01.P0003.AAAC | SHIPPER LABEL | 0.0417 | | | |
| 100200.01.P0007.AAAA | SHIPPER TAPE | 0.0001 | | | |
| ———— | ———TOTAL——— | | | $ | |

SPECIAL INSTRUCTIONS TO DISTRIBUTION

630

SPECIAL INSTRUCTIONS TO SAFETY/ENVIRONMENTS

640

AUTHORIZATIONS

COMPONENT #

SUPPLIER:

COMPONENT DESC.:

PREPARED BY: SUPERCEDES: NEW DATE:

MATERIAL: DECORATED GLASS BOTTLE

DECORATION/COLOR: Fern

REFERENCE DRAWING: DRAWING #

CRITICAL DIMENSIONS:

| | | |
|---|---|---|
| CONTAINER STYLE: | | Custom Square bottle with 18mm GPI finish |
| NECK FINISH: | "T": | 16.67 +0.20/-0.19mm |
| | "E": | 13.71 +/- 0.25 mm |
| | "H": | 8.49 +/- 0.3 mm |
| | "S": | N/A |
| | "ID": | 8.38 mm min |
| BODY: | FRONT TO BACK | 49.3 +0.9/-0.3 |
| | SIDE TO SIDE | 49.3 +0.9/-0.3 |
| OVERALL HEIGHT: | | 107.69 mm ± 1.2 mm |
| HEIGHT TO SHOULDER: | | 98.12 mm |
| PUSH UP: | | 0.5 mm MINIMUM |
| BASE HEIGHT: | | 28 mm |
| HT BASE T0 SHOULDER: | | 70.8 ± 0.7 mm |
| SHOULDER WIDTH-TOP: | | 43.3 +0.6/-0.3 mm |
| BASE WIDTH: | | 49.3 +0.9/-0.3 mm |
| BASE GLASS THICKNESS | | 9 mm to 12 mm |
| OVERFLOW CAPACITY: | | 109 ± 4.5 cc |
| GRAM WEIGHT: | | 226 grams |
| MIN. WALL THICKNESS: | | See standards. |

MATING COMPONENTS: 62110511 Overcap
62110519 pump

PACKING INSTRUCTIONS: Only 1 unit product code per shipper. Quantity, P.O. number, Unit Product Code, Description, and Date of Manufacture on 2 sides of each carton.

SPECIAL VENDOR PACKING: Chip partition between bottles, paper layer on top of bottle finish, corrugate pad on top and bottom of shipper.

TEST REQUIREMENTS/MISC. INFORMATION:
1. The GLASS DISTRIBUTION must be compared to the marketing standards.

2. See Marketing Standard for Artwork

Artowrk Transmittal Date:

DRAWING: DRAWING: DRAWING: ARTWORK:

BILL OF MATERIAL

| | | | |
|---|---|---|---|
| 110 | PROGRAM NAME | : | 15 OUNCE - 444 mL COCOA OIL/ALOE SHAMPOO |
| 20 | PROGRAM CODE | : | 100200.01 |
| 80 | LAUNCH DATE | : | January 1, 2000 |
| 50 | PRICE POINT | : | $40.00 |

| | Q | ID | NAME | DESCRIPTION | QTY/UNIT |
|---|---|---|---|---|---|
| | — | 100200.01.R0001.AAAA | $H_2O$ | | .65 |
| | — | 100200.01.R0002.AAAA | AMM. LAU. SUL. | | .20 |
| | — | 100200.01.R0003.AAAA | COCOA OIL | | .06 |
| 510 | — | 100200.01.R0004.AAAA | ALOE | | .03 |
| | — | 100200.01.R0005.AAAA | SURFACTANT | | .03 |
| | — | 100200.01.R0006.AAAA | VITAMIN E | | .01 |
| | — | 100200.01.R0007.AAAA | FRAGRANCE | | .01 |
| | — | 100200.01.R0008.AAAA | COLORANT | | .01 |
| | — | 100200.01.P0001.AAAA | BOTTLE | | 1 |
| | — | 100200.01.P0002.AAAA | CAP | | 1 |
| | — | 100200.01.P0003.AAAA | FRONT LABEL | | 1 |
| | — | 100200.01.P0003.AAAB | BACK LABEL | | 1 |
| 610 | — | 100200.01.P0004.AAAA | TAMPER EVIDENT BAND | | 1 |
| | — | 100200.01.P0005.AAAA | SHIPPER | | 1 |
| | — | 100200.01.P0006.AAAA | DIVIDER | | 0.0417 |
| | — | 100200.01.P0003.AAAC | SHIPPER LABEL | | 0.0417 |
| | — | 100200.01.P0007.AAAA | SHIPPER TAPE | | 0.0001 |

PURCHASING OVERVIEW

| | | | |
|---|---|---|---|
| 110 | PROGRAM NAME | : | 15 OUNCE - 444 mL COCOA OIL/ALOE SHAMPOO |
| 20 | PROGRAM CODE | : | 100200.01 |
| 80 | LAUNCH DATE | : | January 1, 2000 |
| 50 | PRICE POINT | : | $40.00 |

| | Q | ID | NAME | QTY NEEDED 910 | ON-HAND 920 | ORDERED 930 | OUTSTANDING 940 |
|---|---|---|---|---|---|---|---|
| 510 | — | 100200.01.R0001.AAAA | $H_2O$ | | | | |
| | — | 100200.01.R0002.AAAA | AMM. LAU. SUL | | | | |
| | — | 100200.01.R0003.AAAA | COCOA OIL | | | | |
| | — | 100200.01.R0004.AAAA | ALOE | | | | |
| | — | 100200.01.R0005.AAAA | SURFACTANT | | | | |
| | — | 100200.01.R0006.AAAA | VITAMIN E | | | | |
| | — | 100200.01.R0007.AAAA | FRAGRANCE | | | | |
| | — | 100200.01.R0008.AAAA | COLORANT | | | | |
| 610 | — | 100200.01.P0001.AAAA | BOTTLE | | | | |
| | — | 100200.01.P0002.AAAA | CAP | | | | |
| | — | 100200.01.P0003.AAAA | FRONT LABEL | | | | |
| | — | 100200.01.P0003.AAAB | BACK LABEL | | | | |
| | — | 100200.01.P0004.AAAA | TAMPER EVIDENT BAND | | | | |
| | — | 100200.01.P0005.AAAA | SHIPPER | | | | |
| | — | 100200.01.P0006.AAAA | DIVIDER | | | | |
| | — | 100200.01.P0003.AAAC | SHIPPER LABEL | | | | |
| | — | 100200.01.P0007.AAAA | SHIPPER TAPE. | | | | |

QUALITY ASSURANCE OVERVIEW

| | | | |
|---|---|---|---|
| 110 | PROGRAM NAME | : | 15 OUNCE - 444 mL COCOA OIL/ALOE SHAMPOO |
| 20 | PROGRAM CODE | : | 100200.01 |
| 80 | LAUNCH DATE | : | January 1, 2000 |
| 50 | PRICE POINT | : | $40.00 |

| | PO # | ID | NAME | RECEIVED | Q/A APPROVED |
|---|---|---|---|---|---|
| | | 100200.01.R0001.AAAA | $H_2O$ | | |
| | | 100200.01.R0002.AAAA | AMM. LAU. SUL | | |
| | | 100200.01.R0003.AAAA | COCOA OIL | | |
| | | 100200.01.R0004.AAAA | ALOE | | |
| 510 | | 100200.01.R0005.AAAA | SURFACTANT | | |
| | | 100200.01.R0006.AAAA | VITAMIN E | | |
| | | 100200.01.R0007.AAAA | FRAGRANCE | | |
| | | 100200.01.R0008.AAAA | COLORANT | | |
| | | 100200.01.P0001.AAAA | BOTTLE | | |
| | | 100200.01.P0002.AAAA | CAP | | |
| | | 100200.01.P0003.AAAA | FRONT LABEL | | |
| | | 100200.01.P0003.AAAB | BACK LABEL | | |
| 610 | | 100200.01.P0004.AAAA | TAMPER EVIDENT BAND | | |
| | | 100200.01.P0005.AAAA | SHIPPER | | |
| | | 100200.01.P0006.AAAA | DIVIDER | | |
| | | 100200.01.P0003.AAAC | SHIPPER LABEL | | |
| | | 100200.01.P0007.AAAA | SHIPPER TAPE | | |

WORK ORDER

| 110 | PROGRAM NAME | : | 15 OUNCE - 444 mL COCOA OIL/ALOE SHAMPOO |
|---|---|---|---|
| 20 | PROGRAM CODE | : | 100200.01 |
| 80 | LAUNCH DATE | : | January 1, 2000 |
| 50 | PRICE POINT | : | $40.00 |

| | ID | NAME | QTY W/ SCRAP | DELIVERED | CONSUMED | BACKFLUSHED |
|---|---|---|---|---|---|---|
| 510 | 100200.01.R0001.AAAA | H₂O | | | | |
| | 100200.01.R0002.AAAA | AMM. LAU. SUL. | | | | |
| | 100200.01.R0003.AAAA | COCOA OIL | | | | |
| | 100200.01.R0004.AAAA | ALOE | | | | |
| | 100200.01.R0005.AAAA | SURFACTANT | | | | |
| | 100200.01.R0006.AAAA | VITAMIN E | | | | |
| | 100200.01.R0007.AAAA | FRAGRANCE | | | | |
| | 100200.01.R0008.AAAA | COLORANT | | | | |
| 610 | 100200.01.P0001.AAAA | BOTTLE | | | | |
| | 100200.01.P0002.AAAA | CAP | | | | |
| | 100200.01.P0003.AAAA | FRONT LABEL | | | | |
| | 100200.01.P0003.AAAB | BACK LABEL | | | | |
| | 100200.01.P0004.AAAA | TAMPER EVIDENT BAND | | | | |
| | 100200.01.P0005.AAAA | SHIPPER | | | | |
| | 100200.01.P0006.AAAA | DIVIDER | | | | |
| | 100200.01.P0003.AAAC | SHIPPER LABEL | | | | |
| | 100200.01.P0007.AAAA | SHIPPER TAPE | | | | |

1200

BILL OF LADING

| | | | |
|---|---|---|---|
| 110 | PROGRAM NAME | : | 15 OUNCE - 444 mL COCOA OIL/ALOE SHAMPOO |
| 20 | PROGRAM CODE | : | 100200.01 |
| 180 | LAUNCH DATE | : | January 1, 2000 |
| 50 | PRICE POINT | : | $3.83 |
| 60 | ORDER QUANTITY | : | 24 |

TODAY'S DATE:

| | |
|---|---|
| TO: | INVOICE |

| | | | |
|---|---|---|---|
| INVOICE # | C0001.001.100200.01 | P.O. # | |
| CUSTOMER # | C0001.001 | ORDER # | C0001.001.100200.01 |
| TRACKING # | C0001.001.100200.01 | ORDER DATE | |

| | |
|---|---|
| SHIP VIA | |
| QUANTITY | |
| SALE AMOUNT | |
| MISC CHARGES | |
| FREIGHT | |
| SALES TAX | |
| TOTAL | |
| PAYMENT TERMS | |
| PART OF PROMO (IF ANY) | |

COMMENTS:

| | A | | | | | P | | |
|---|---|---|---|---|---|---|---|---|
| 1300A | C | VVVV 1320A | WWW 1330A | XXXXXX 1340A | YY 1350A | R 1360A | ZZZZ 1370A | AAAA 1380A |
| | V 1310A | | | | | | | |
| 1300B | A 1310B | 0001 1320B | 001 1330B | 100200 1340B | 01 1350B | | | |
| 1300C | C 1310C | 0001 1320C | 001 1330C | 100200 1340C | 01 1350C | | | |
| 1300D | V 1310D | 0001 1320D | 001 1330D | 100200 1340D | 01 1350D | P 1360D | 0001 1370D | AAAA 1380D |
| 1300E | V 1310E | 0002 1320E | 001 1330E | 100200 1340E | 01 1350E | R 1360E | 0001 1370E | AAAA 1380E |

COMPUTERIZED SYSTEM TO IMPROVE PROCESS OF BRINGING CONSUMER PRODUCT TO MARKET

CROSS-REFERENCE TO RELATED APPLICATION

This application claims the continuation of U.S. patent application Ser. No. 09/398,742 filed on Sep. 17, 1999, now abandoned, and which is incorporated herein by reference.

FIELD OF INVENTION

The present invention relates to product development processes, and more particularly to a computerized system adapted to enable consumer products companies to bring new products to market more efficiently.

BACKGROUND OF INVENTION

Currently, consumer products companies bring new products to market inefficiently. For example, Marketing generates a product idea. Next, they communicate this idea to the rest of the company. Usually, a hard copy of a computer software spreadsheet highlighting specific details of a product is distributed to all Strategic Business Units ("SBUs"). SBUs integral to this process include: Sales, to communicate the new product idea through the marketplace; Finance, to obtain proper financing; Accounting, to keep track of costs; Research and Development, to develop products; Packaging, to develop all packaging components; Logistics, to plan manufacturing, filling, and distribution of the product; Purchasing, to buy raw materials and components from applicable vendors; Quality Assurance, to monitor incoming and outgoing quality; Manufacturing, to make the product; and, Distribution, to get the final product to the retail establishment for sale to the final customer.

Each SBU is dependent upon one another and uses the same basic information to perform their individual job functions. Unfortunately, most SBU'S use software packages specifically tailored to their disciplines and incompatible with those of other SBUs they must interact with. This forces each SBU to generate new hard copies, using discipline specific software, of the same information to execute various job tasks and to communicate with subsequent SBUs in the development process. Each subsequent SBU throughout the company repeats the process (i.e. prepare a new hard copy of the same information). However, no software package exists today which starts with Marketing and ends with Distribution, or in other words is capable of being used throughout the entire life-cycle of a new product/package development.

Therefore, there is a need for a single computerized system which can be used by Marketing, and each subsequent SBU to assist the process of getting a product to the consumer.

SUMMARY OF THE INVENTION

A computerized system for aiding in development of a product, the system including: a plurality of user interfaces each respectively associated with a set of tasks for developing the product and adapted to assist a user thereof complete the associated set of tasks, wherein select information entered into one of the interfaces is automatically duplicated and dynamically updated in others of the plurality thereby eliminating duplicative data entry at different stages of developing the product; at least one database accessible from at least one of the user interfaces and for storing data relating to packaging components and raw materials, wherein select ones of the packaging components and raw materials are associated with the product; and, a tracking system for tracking the development of the product, the tracking system including unique identifiers for the product, the select packaging components and the select raw materials, wherein the unique identifiers associated with the select packaging components and raw materials further identify the product.

In a particular preferred embodiment of the present invention, the database is further adapted to store data relating to artwork, vendors associated with raw materials, packaging components and consulting services and customers for the product to be developed.

BRIEF DESCRIPTION OF THE FIGURES

FIG. 1 illustrates a marketing bulletin according to the present invention.

FIG. 2 illustrates a sales sheet according to the present invention.

FIG. 3 illustrates a finance proposal according to the present invention.

FIG. 4 illustrates an accounting page according to the present invention

FIG. 5 illustrates a Research and Development layer according to the present invention.

FIG. 6 illustrates a Packaging layer according to the present invention.

FIG. 7 illustrates a packaging component specification layer according to the present invention.

FIG. 8 illustrates a bill-of-material according to the present invention.

FIG. 9 illustrates a purchasing layer according to the present invention.

FIG. 10 illustrates a quality assurance layer according to the present invention.

FIG. 11 illustrates a work order according to the present invention.

FIG. 12 illustrates a bill-of-lading according to the present invention.

DETAILED DESCRIPTION OF THE INVENTION

Figure 13:
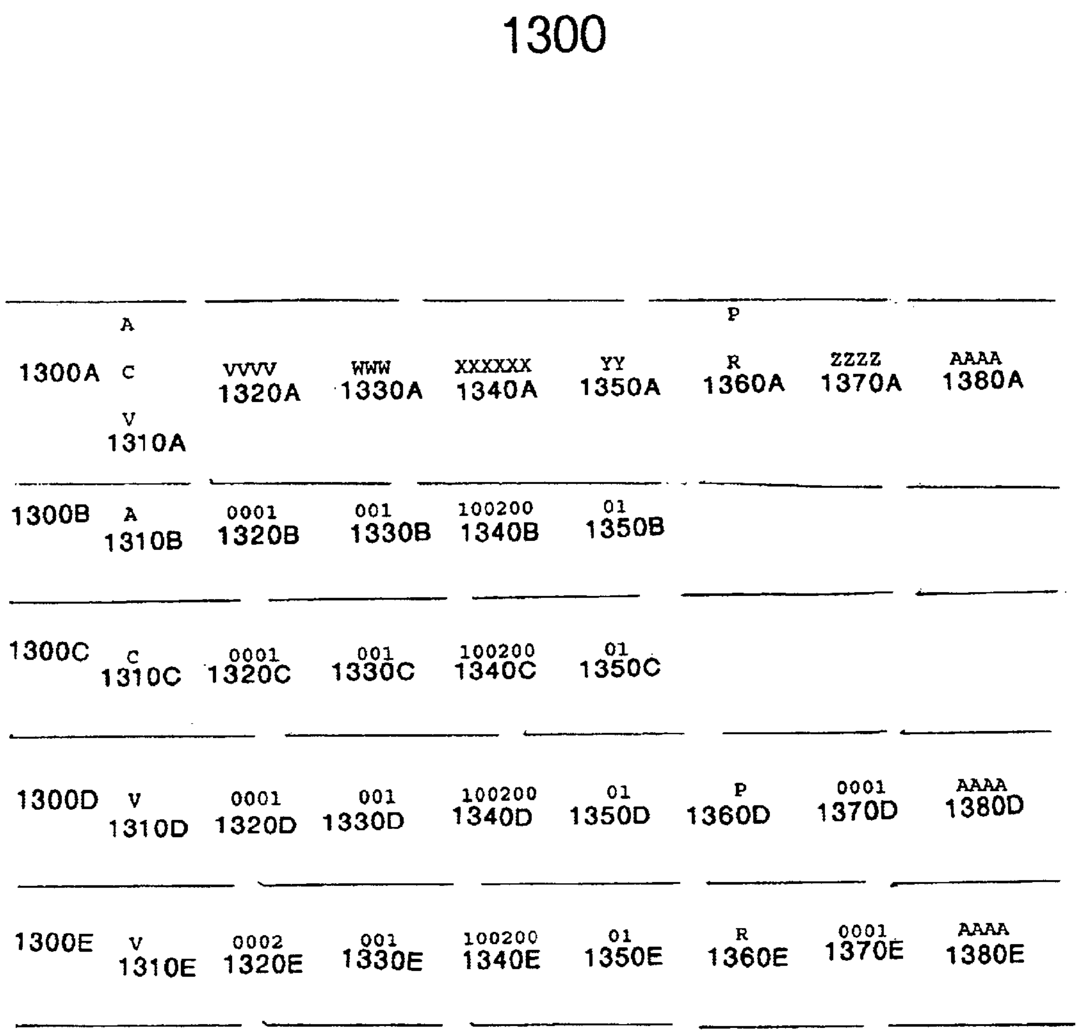
FIG. 13 illustrates a tracking scheme according to the present invention.

The system, according to the present invention, accommodates all SBUs and their specific needs. First, a standard format will be used by all. Second, special attachments may be added to the standard format by each SBU as needed. In conjunction, research has shown the most common type of software used across all disciplines to manage information is spreadsheet based. For this reason, a spreadsheet format should be utilized in this software, (if a spreadsheet is not desired, any data management software type, a database for example, may of course be used to coordinate and present the information). This will allow current spreadsheets used in companies, across most SBUs to be integrated into the new software and will require minimal training since most business professionals are generally familiar with spreadsheets and their use.

According to a preferred form of the present invention, each SBU is assigned a "layer" of an electronic document (i.e. spreadsheet or database) having a plurality of "layers".

Each layer contains much of the same information, and is intended for each specific SBU in the process. It should be recognized this is unlike conventional consumer product company operation where the same information is generated by every SBU since incompatible software packages are used. Further exasperating this situation is the independent assignment of tracking data by each SBU (which is particularly addressed through the use of a unique tracking method as will be discussed). In a preferred form of the invention, each SBU may add attachments, files attached, to their layer since ancillary data documents are often required to complete their job tasks. According to the invention, this will greatly improve efficiency due to all information being shared electronically and since one software satisfies the entire company's needs.

Further, each SBU interacts with suppliers and vendors outside the company. The spreadsheet format, or for that matter any other software tool being used to implement the present invention, provides an additional advantage that it will be simple enough for those outside companies to use and/or integrate into their internal systems and/or subsystems.

In a preferred form of the invention, this information can be shared electronically through the Internet, as it is anticipated to be the most efficient method for doing such. However, it should be recognized the Internet is not required, as data may be shared via e-mail or by disk exchange as well for example. Almost all vendors will be able to access information if it is compatible with Microsoft Office Programs such as "Excel" for example, which are used predominately by business today. Of course, any other standard format or software standard could be used.

It is important to provide an easy to use, easy to share, easy to communicate with, and easy to integrate software not only in the "host" company but also in the vendor companies. Much existing software is available for specific disciplines but a software suitable for all SBUs from the beginning to the end of the consumer product development process is not. Discipline specific data management software techniques/standards of data management in-use today should be preferably recycled into this new software in order to address routine tasks performed by each SBU. Therefore, standard business documents should not be recreated but preferably blended into the new software.

In this way, duplication of effort will be eliminated and overall efficiency will be increased dramatically.

For instance, several Packaging Specification software packages are available on the market today. However, they are not Microsoft spreadsheet based and only Packaging Engineers use and understand the information. The system according to the present invention preferably adopts certain accepted standards of presenting information within these software packages, but is also preferably set-up in a spreadsheet format so everyone in the company can use and understand the information as well. Effectively, the ambiguities of each function will be diluted in order to let everyone understand each other's activities, thus, streamlining the overall process. Of course, this occurs not only for Packaging Specifications, but also, Accounting Ledgers, Logistics Bills-of-Material, Purchasing Purchase Orders, Financial Cost Estimates, Manufacturing Production Schedules, and all the other activities discussed in the "layers" as is set forth below.

In general, the core documents required when bringing a new consumer product to the market are the Marketing Bulletin, R&D Profile, Packaging Profile, Planning Bill-of-Material, and Manufacturing Work Order. These documents are inherently the same. They illustrate the list of raw materials and packaging components required to produce the unique consumer product. All other documents are ancillary to this master list, but introduce discipline specific information required to perform discipline specific functions throughout the process. It is important to note that even though other documents are required they all relate to the master list originally created by Marketing, namely the Bulletin.

Marketing

Referring now to the numerous figures, wherein like references refer to like elements of the invention, FIG. 1 illustrates a marketing bulletin 10 generated by Marketing. It should be recognized that in general, the use of marketing bulletins is notoriously well known in the art. As set forth, according to the preferred embodiment of the invention, the marketing bulletin 10 represents a first layer of an electronic document having several layers, and can be considered to be a primary source of data for the other layers, and hence the other SBUs. In other words, the marketing bulletin 10 provides information which is preferably, automatically duplicated and dynamically updated on other layers as each SBU uses the system according to the present invention and enters appropriate data on their respective layer.

Attachments added to each layer may be available to all SBUs or only the SBU that generates the attachment depending upon the nature of the attachment and the user's preferences for example.

An original product code number 20 is assigned to the product to be developed (herein referred to as "the product") by Marketing and reflected on the bulletin 10. It is also possible to assign different product numbers to the product depending upon an intended market, i.e. domestic, international, Canada, Asia . . . (20', 20", 20'"). The bulletin 10 also preferably includes a target Cost of Goods or COG 30, target sale price to wholesalers 40, a target retail price 50 and proposed minimum order quantity 60. It further preferably includes product type 70 (any consumer product in any industry, in consumer products for example: shampoo, lotion, fragrance, food item, hardware item, tool, toy, etc.), general information 80 on the type of packaging components (glass bottle, plastic cap, carton, etc.), and forecast and sales projections 90. Finally, the bulletin 10 preferably includes program name 110, which is the title of the program associated with the product, program objective 120, product profile 130, additional comments field 140, project management information 150, brand information 160 and season information 170, each associated with the product to be developed and brought to market. Of course, depending upon a particular company's methods and internal preferences, the particular types and pieces of information reflected on the marketing bulletin 10, and for that matter any particular layer, can change to permit customization of the present invention, without departing from the spirit of the invention.

As set forth, according to the present invention, the bulletin 10 is preferably the master document sent to the SBUs, and sometimes the entire company. This document preferably takes the form of a standard template spreadsheet according to the present invention. Data for the fields (corresponding to information 20–170) will be filled in by Marketing as in a conventional approach.

More specifically, Marketing enters Product codes 20, 20', 20" and 20'" (depending upon which are applicable). Marketing further preferably enters COG 30, Net 40, Retail price-point 50, minimum order quantity 60, and budget classification 70 onto the bulleting 10. Packaging information and other pertinent information which Marketing wishes to communicate to the other SBUs is entered into program details 80 and/or comments 140. In the specific embodiment of FIG. 1, program details 80 is illustrated as being entered into a scrolling window to conserve screen space, as is well known in the art, of course other conventional means could be applied instead or as well though.

Marketing further preferably enters market forecast data 90, program name 110, program objective 120, product profile 130, comments 140, project management information 150 (dead-lines), brand 160, season 170, desired launch date 180 and shipper details 190.

It should be understood, that using conventional means Marketing could either enter this information directly onto an electronic version of the form of FIG. 1, or enter the information using prompts and dialog boxes, or any other suitable convention as is well known in the art for data entry. In a preferred form, the system according to the instant invention performs some rudimentary checks on the data entered by Marketing to ensure compliance with system standards (i.e. text/numeral formats, dates where required, mandatory fields are entered . . . ).

Upon completion of entry of this information by Marketing, all authorized users of the instant system now have the advantage of having all data which may be required by them already in electronic form in a managed and familiar format, thus expediting the process of bringing a product to market by eliminating what was heretofore work duplication. (As set forth, attachments, such as specific product artwork from Design/Graphic Arts, may be attached to this layer by Marketing or in Packaging below for example.)

Attachments for the marketing layer could include for example: demographics, focus group studies, marketing research and competitive analysis's. These could be accessed through an attachment drop list with appropriate tools to allow for addition and deletion of attachments therefrom, or by simply inserting a link (HTTP or for a file for example) into the layer at an appropriate insertion point.

Sales

Referring now also to FIG. 2, according to the present invention, a sales sheet 200 is automatically generated and dynamically updated by the novel system using the marketing bulletin 10. In this way, sensitive internal data may be blocked (not shown to outside sales prospects, or the other SBUs if so desired), and applicable sales data can be added. This sales data can include for example: dates the product is available, promotions, if any, sales price and volume discounts. Additionally, certain information can be provided which is preferably directly updateable by sales personnel. This information can include for example: actual sales from the field inputted by month, actual customer names and locations buying the product, actual order quantities and dates, and any product performance issues and/or returns or other comments, in the format of standard Customer Service reports.

By automatically generating this sales sheet 180 from the bulletin 10, valuable employee time is freed up, as this information doesn't need to be duplicated and reentered manually by the Sales SBU. Additionally, reliability is improved as typographic errors which could adversely effect sales and/or production and distribution are avoided. Further, by using subsequent layers of a single electronic document, Marketing, or for that manner any other authorized individual or SBU, is able to quickly and accurately ascertain more available information regarding the product, its development and progress toward release than would otherwise be possible. For example, one advantage of the present invention lies in that it is easy to compare actual pre-sales data (from Sales) to projected sales data 90 (from Marketing) to determine whether proper measures are being taken in the product's development, i.e. production schedules, availability of raw materials, etc. . .

Referring to the specific embodiment and configuration of the example of FIG. 2, for purposes of explanation, the sales sheet 200 can be seen to include data entered onto the Marketing bulletin 10 as has been set forth. More particularly, it is seen to include program name 110, program code 20, launch date 180, price point 50, order quantity 60 and applicable market forecast information 90. Additionally, the Sales SBU can enter promotions information 210 which is also illustrated in a scrolling window and actual sales data 220.

Referring back to Marketing, it is customary for a sales forecast, broken down by some predetermined time intervals, to be supplied. This information is designated as 230 on sales sheet 200. Marketing could either enter this information directly onto the sales sheet 200, or if prompts and dialog boxes are used for example, this information could simply be automatically placed onto the sales sheet 200, which is preferred. The information 230 can be seen to be a more detailed view of the applicable portion of forecast information 90, which is preferably automatically generated by the system according to the instant invention.

Sales sheet 200 further preferably includes customer information entered using elements 240 or 250 which permits sales personnel to enter and edit actual sales information regarding the product, i.e. customer, quantity and desired ship date, into the instant system using drop lists which can be populated through the use of a conventional customer database, Customer Service database, and/or sales tracking database for example, as well as information on customers. This information is preferably then automatically and dynamically summarized into data 220. Further, sales personnel may enter comments 250, which is again illustrated to be a scrolling window. An important feature of the present invention to be realized being that all authorized personnel, regardless of SBU association can review the data on the sales sheet 200 as well as the bulletin 10 without any additional effort being expended by either Marketing or Sales. Further, pieces of information that previously resided with different SBUs and hence was not easily comparable now becomes so as has been set forth. Further, ship dates for actual sales can be automatically compared against the desired launch date 180 to insure that product will be available for shipment. And, as individual layers can be updated, or revised, as the process of product development proceeds, changes in particular pieces of information can be compared to other information entered, regardless of by who, preferably automatically, to insure no conflicts have been generated. For example, the product has not been oversold if forecasts are lowered or shipping dates of actual sales will not be missed because the projected release date is delayed. In this way, what was a static process with little to no way of determining the ramifications of changing data, becomes a fully dynamic process tracking system.

Additionally, using conventional methods, sign off's or authorizations 260 can be supplied so it can be easily ascertained who has approved the sales sheet 200. This can be accomplished using conventional password protection for example.

Attachments for the sales layer could include for example, files or documents which indicate similar products and the associated customer base information(location, shipping, product base, order quantities, etc.). These could be accessed through an attachment drop list with appropriate tools to allow for addition and deletion of attachments therefrom, or by simply inserting a link (HTTP or for a file for example) into the layer at an appropriate insertion point. This information could also be entered using the comments field 250 for example. Customer Service may use field 250 to evaluate consumer complaints as well as performance ratings on customers and/or vendors.

Finance

Referring now also to FIG. 3, the Finance SBU, as set forth, is responsible for obtaining proper financing. Accordingly, another layer of the electronic document is preferably generated including information which is required to this end. Further, applicable finance data is preferably added by the Finance SBU, such as: the amount of capital expenditure required, timing for the project, payback schedule for capital outlays, and budgeting and approval data from upper management for example.

Referring more particularly to the specific embodiment of FIG. 3, therein is illustrated a financing proposal 300. Again, it can be seen to include data entered onto the Marketing bulletin 10 as has been set forth. More particularly, the proposal 300 preferably includes program name 110, program code 20, launch date 180 and price point 50. Additionally, the proposal 300 includes financing information 310. As is well known, each SBU budgets for expenditures it anticipates having to make in order to complete their phase of the process of bringing the product to market. These expenditures are then communicated to Financing, so proper arrangements can be made and opinions regarding the viability of the product can be prepared by management, for example.

A Summary of these expenditures are preferably included on the proposal 300, and may be entered either by the Financing SBU, or other SBU's depending upon the preference of the company implementing the system according to the present invention. However, according to the preferred embodiment, each SBU supplies the description, funds required, when the funds are required by, and when the funds will be realized to Finance, for their inclusion on the proposal 300. This information is preferably communicated by e-mail for example and may be copied and attached to the proposal 300 by providing a link to each SBU's name (i.e. clicking on marketing in information 300 opens the file which includes Marketing's proposal and request for funds and was sent to Finance).

From this additional information provided, Finance is capable of determining estimated payback times and whether to expense or capitalize each anticipated expenditure. Again, a summary of this derived information is preferably provided on the proposal 300 in information 310. Again, according to the preferred form of the invention, additional information is available on any of these summarized item by clicking on them with a mouse as is well known, which preferably causes a respectively associated file containing that information to open using appropriate software (i.e. Microsoft Word for a document). The summarized data 310 is preferably further summarized into data 320 which is also displayed on the proposal 300. For example, the expenditures are preferably automatically summed and the greatest of the payback periods is preferably adopted as the total payback period, as is well known.

According to the preferred form of the invention, proposal 300 further includes timeline summary 330 which is automatically generated from the information provided to Finance and appropriate approval fields as have been discussed above.

As set forth, information is preferably entered through the use of dialog boxes for example, which permits personnel to quickly and accurately enter data into the appropriate layers as well as easily identify files to be respectively associated as including further data about individual fields or entries on the proposal 300, through the use of a browse and attach feature similar to conventional e-mail systems for example. It should be recognized, that the system according to the present invention creates a way of using what where heretofore static documented as interactive and dynamic information management system for expediting product, including package, development.

Accounting

Referring now to FIG. 4, accounting similarly has a dedicated layer to which it can preferably attach such files as applicable ledger tracking spreadsheets. Again, a realized advantage being that the present invention eliminates duplicative data entry and bookkeeping as well as making more information relating to the product's development available to more people. Preferably, links to the appropriate spreadsheets from Accounting are also provided at suitable locations in the other SBU layers of the instant system. For example, all accounting records which are integrated into the present system that relate to photoshoots for Marketing would be accessible through both the Marketing and Finance layers as well as the Accounting layer. The Accounting layer further preferably includes a duplication of the information 310 of the Finance proposal 300, and appropriate links are therein to appropriate accounting files.

Referring more particularly to the specific embodiment of FIG. 4, therein is illustrated an accounting page 400. More particularly, the accounting page 400 preferably includes program name 110, program code 20, launch date 80 and price point 50. Additionally, the accounting page 400 includes financing information 310 with links 420'–420$^{vi}$ providing access points to open the original requests from each respective SBU, as has been set forth regarding the finance proposal 300. Additionally, links 420'–420$^{vi}$ preferably provide access points for the particularly associated spreadsheet for each SBU by opening it with an appropriate software package (i.e. Lotus 1-2-3 or Microsoft Excel). Of course, depending upon the specific requirements or preferences of an organization using the instant system, other links and information could of course be displayed on the accounting page 400, as with all other layers according to the present invention.

Research and Development (R & D)

Referring now also to FIG. 5, likewise, Research and Development is preferably provided a dedicated layer for a timeline for product development. Therein is preferably recorded applicable milestones in development. Further, several sub-layers, or attachments, may be provided for detailed sub-development. For example, a separate section or link to a file profiling each raw material can be provided. Referring now to the specific embodiment of FIG. 5, therein is illustrated a product specification 500. The specification 500 preferably includes program name 110, program code 20, launch date 80 and price point 50. Further, it preferably includes raws profile 510 which is essentially a list of the ingredients needed to make the product, i.e. a recipe. The profile 510 preferably includes an identification number for the ingredient, or will be discussed a general name for the ingredient, a description of the ingredient, the amount or quantity of the ingredient for each unit for sale (quantity by % weight) and an estimated time frame after which that ingredient should be available (i.e. for the company to develop it, or for it to be ordered and received from a vendor for example). Preferably, the profile 510 according to the present invention further includes a cost estimate 520 which is automatically generated as will be discussed, and sections 530 and 540 for respectively entering special instructions to the packaging group and safety/environmental groups for example.

The system according to the instant invention preferably includes a database of all raw materials which are used for its products. This database preferably includes all information necessary for the item to be purchased, and some information capable of uniquely identifying it. For example, in a preferred embodiment, the raw materials database includes an identification number, classification (name) for the raw, a brief description of the raw, specification for the raw as are conventionally used, an estimated cost for the raw, any safety issues related with the raw, special conditions required for storage of the raw, testing procedure for the raw for quality assurance and those vendors qualified to sell the product for example. For example, there may be several waters in the system, as water of different qualities are used in different products (i.e. one product may require water between 6.7 and 7.3 PH, while another product may only use water between 6.9 and 7.1 PH. These waters should be listed as different raw materials (with different individual specification numbers, i.e. AAAA, AAAB, . . . as set forth in the tracking section, element 1380 for example) in the database. R&D can select products from this database by using a drop list or search for example, as is illustrated using the "∀" in FIG. 5. In this way, R&D personnel can clearly and unambiguously communicate all information required to make the product to the other SBUs. If a raw is needed which is not in the database, the R&D personnel can simply specify it out as clearly as they can for further completion later. In this way, purchase orders can be easily generated, and information need not be manually duplicated later as with conventional methods.

The estimated cost of the recipe 520 can be calculated from this data, as the cost of each ingredient is known, the % weight of each ingredient is known and the total amount of the product/unit is known (i.e. 440 mL). This can be automatically copied to the Marketing, Logistics and Accounting pages for their review in an alternative embodiment of the invention, or automatically reported to the appropriate personal via e-mail for example, upon the entering and approval of it by R & D.

As set forth, the raws database preferably includes every individual raw material's specification, these specifications will be automatically generated, by templates in the software database, for each type of raw material (i.e. oil, surfactant, emulsion, fragrance, starch, binder, etc.) prompting for data to be entered thereinto, as such information is predictable based upon the type of material it is (for example all surfactants illustrate particular properties that packaging should be aware of, further vendors require specific information in order to supply the proper product to the host company). Again, links are preferably provided so more information on each ingredient (i.e. specification, authorized vendors . . . ) can be viewed (for example by clicking or double clicking on each raws name, description or identification number (ID).

Attachments for the R & D layer could include for example, federal agency evaluations (FDA, EPA, DOT, CPSC, etc.) and test evaluations and results. These also could be accessed through an attachment drop list with appropriate tools to allow for addition and deletion of attachments therefrom, or by simply inserting a link (HTTP or for a file for example) into the layer at an appropriate insertion point.

Packaging

Another layer of the electronic document is preferably dedicated to Packaging. This layer operates identically to the R&D layer, however it is dedicated to packaging components for the product instead of the ingredients thereof. Referring now also to FIG. 6, therein is illustrated a packaging profile 600. Again it should be understood that the use of packaging profiles in general is notoriously well known in the art.

The profile 600 preferably again includes program name 110, program code 20, launch date 80 and price point 50. It further preferably includes a components list 610. The components list 610 can be seen to be substantially similar in operation and use as the ingredients list 510. The component list 610 is a list of packaging components required to package the R&D developed product. As an example, components required to package a fragrance may include: (1) glass bottle; (2) metal pump; (3) plastic overcap; (4) base label; (5) carton liner; (6) carton; (7) protective packaging; (8) corrugated shipper; and, (9) manufacturing shipping label. Referring again to the profile 600 it further preferably includes estimated cost of packaging table 620, special instructions to distribution 630 and special instructions to safety/environments 640. Again the table 620 is substantially similar in both object and operation as the table 520 of the R&D page 500. Accordingly, the system according to the preferred embodiment of the instant invention further includes a database for packaging components identical to that one used for raw materials.

Referring now to FIG. 7, therein is illustrated a specification that would be entered into the components database according to the instant invention for a decorated glass bottle. All specifications for glass bottles include the same information pieces, only with different values which reflect the particulars of that component. Similarly, the raw materials database preferably includes a specification for each type of raw material, i.e. water would include such specifications as PH, clarity, NaCl . . . preferably the sub-layers, documents which can be accessed by clicking on the document, further include every individual "Component Specification". These specifications are preferably automatically generated, by templates in the software database, for each type of component (glass bottle, carton, label, etc.), allowing the specifics to then be entered using a menu type system for example. Referring again to FIG. 7, typical packaging information for a bottle preferably includes: (1) package type; (2) material; (3) thickness and weight; (4) L×W×H; (5) vendor/s of choice; (6) any other specific information; (7) attachments: a) Engineering detailed print, b) Marketing Artwork including layouts.

Other information which could be included on the Packaging layer is Assembly Instructions for Manufacturing, and a Pallet Pattern with instructions, weights, & measures to ship. In a preferred form of the invention, the packaging layer may further include environmental data for all countries of sale and material safety information if applicable (this can be accomplished by varying the tracking code, 100200.01, 100200.02, . . . for example). All of these attachments can preferably be guaranteed in their conventional way, and files reflective thereof being attached to an appropriate layer (i.e., so a user may simply click on a link to access them).

Other attachments for the packaging layer could include for example, files or documents which indicate ASTM or ISTA package handling test results. These could also be accessed through an attachment drop list with appropriate tools to allow for addition and deletion of attachments therefrom, or by simply inserting a link (HTTP or for a file for example) into the layer at an appropriate insertion point.

Logistics

Referring now also to FIG. 8, logistics preferably also has a dedicated layer of the electronic document. The bill of material 800 preferably includes the raw materials entered at the Research and Development layer into the raw materials profile 510 and the packaging components 610 entered at the Packaging layer. Hence, the logistics layer automatically is provided and dynamically updated with the raws and components, which together provide everything to produce the product and package it for distribution and eventual sale to the customer.

Preferably, this layer 800 shows the amount of each item in the recipe to make one finished product (raw materials and packaging components), while another portion illustrates the monthly Marketing forecast for one year (obtained from Marketing Bulletin 10), actual sales (obtained from Sales Sheet on the Sales layer) and the on-hand inventory. Therefore, this second portion of the Logistics layer also allows Logistics the ability to plan the production of the consumer product against the expected forecast and actual sales. A third portion of the Logistics layer shows the status of Purchase Orders for raws and components, (tied into Purchasing layer as well), and built-in signals notify personnel if a timing conflict exists (via mail or on screen display for example). A fourth portion of this layer allows Logistics to plan raws and components that make-up each finished good, thus satisfying individual raw and component forecasts and use rates, while a fifth portion of the layer preferably illustrates preliminary cost sheet/s and the final product/package costs to the customer. Amounts of raws and components are called out in the raws and packaging profiles which can be multiplied by forecast or actual sales data to estimate total amounts required. It should be recognized that these activities are widely know as MRP, Materials Requirement Planning, in the industry, however, the present invention permits for easier and more accurate preparation of the same. Further, as will be discussed below, as the individual SBUs update their individually associated layers, data can change throughout the multiple layers, as information is shared. This dynamic sharing of data results in improved schedules for product development as well as improving the individual SBUs ability to identify and address potential problems, in timing for example.

The bill-of-material 800 is preferably generated including applicable raw materials including for example in the case of a fragrance: raw material components in the formula, percentage of each raw in formula, price per unit of sale and per percentage in formula, specific instructions to Packaging (sensitivity to rays of light, moisture, temperature, shock and vibration for example). A further advantage realized being that this will assist Packaging when developing protective packaging as they are provided information in a faster more readably usable form. This information could be provided through the specification sheets for example, or by duplicating (either displaying or printing out) the special information sections 530, 540, 630 and 640 for example.

Purchasing

Preferably another layer is dedicated to Purchasing for facilitating preparation and tracking of Purchase Orders. As set forth, each raw material and each packaging component is selected, or entered the first time, into the raw materials and packaging components databases, respectively. Accordingly, as these databases preferably include all information required to order each raw and component, purchasing can be quickly and efficiently completed by any person, regardless of SBU affiliation, simply by checking a purchasing page. Referring for example to FIG. 9, therein is illustrated a purchasing overview 900. The overview 900 again preferably includes program name 110, code 20, launch date 80 and price point 50. Preferably information 510 is duplicated from the raws specification 500 from the Research and Development layer and component specification 610 is duplicated from the Packaging layer 600. The quantity needed for each raw and component for production is then calculated by using: the estimated sales FIGS. 230 or sales FIGS. 240 or some other run quantity (depending upon each particular company's preferences and procedures); and the amount of raws or components per unit. The number of on-hand units are preferably entered into the system and subtracted from the quantity needed. The quantity which has previously been ordered but has not yet been received is preferably entered or in an alternative form automatically generated from purchase orders as all of this information is also resident within the system. These quantities are used to calculate the remaining amount of raws and components which are outstanding and hence must still be ordered. According to a particularly preferred form of the invention, if a vendor is entered into the raw or component database, and that vendor is to be used again, the system automatically generates a purchase order for it. Each raw material P.O. preferably includes: raw material or component specification; conditions of order, such as billing and payment schedules; additional information as required for tracking; notification to Receiving what should be expected; notification back to Purchasing if items are late or not received; and a notification to Quality Insurance of what inspections will be required.

Attachments for the purchasing layer could include for example, freight, billing, payment schedules, performance ratings, etc. These could be accessed through an attachment drop list with appropriate tools to allow for addition and deletion of attachments therefrom, or by simply inserting a link (HTTP or for a file for example) into the layer at an appropriate insertion point. Further, it should recognized that many of these attachments, much like those for the other layers could be automatically generated from a database of past results and answers provided by a user of the system by what date.

Q/A

Similarly, Quality Assurance is preferably provided a dedicated layer associated with Inspection of raws, packaging components, and finished goods or final assembled products. Preferably, all Purchase Orders placed by Purchasing are still organized by original product code number, as generated by Marketing as will be discussed, and are highlighted for inspection. As set forth, R&D and Packaging respectively generated testing protocols for each raw and each component, and entered those protocols into the raws and components databases on a second page thereof for example. The quality assurance overview 1000 preferably includes program name 110, code 20, launch date 80 and price point 50 again. It further preferably includes every purchase order for the raws 510 and components 610 which can be generated by a query as is well known. When received, the date can be entered on the page 1000 and, when approved by Q/A, that also can be recorded for example by entering an approval date (using a password for example). The same procedures can be applied to outgoing product as well for example.

When Q/A records their results that particular ingoing or outgoing items (i.e. packaging components, raw materials, product) have either passed or failed, and any applicable comments, automatic reports can be generated therefrom to let appropriate individuals evaluate the developmental process's progress. For example, if a specific raw material has a high rate of rejection, purchasing will preferably receive a report each time a rejection is made, upon receiving these reports, appropriate inquiries can now be identified and completed more easily. In a particularly preferred form, these reports could be e-mailed for example. Purchasing may then address issues with an appropriate internal group, Packaging Design as an example, or external group, the applicable vendor as an example, and make instantly dynamic improvements based on Q.A. attribute reports on raws, components, or finished goods.

Manufacturing

Referring now to FIG. 11, another dedicated layer is provided for Manufacturing. It includes a Work Order, which corresponds to the Bulletin 10, and Bill-of-Material 800. This layer is created/updated/finalized as each SBU completes their specific layer. The final Work Order should mirror the final Bill-of-Material 800, and is generated and double checked against it. It shows the Manufacturing facility what they will need to fill this order and should prepare the proper scheduling of facility equipment and personnel available. Further software should be integrated here to keep track of all raws, components, and finished goods via their individual specification numbers and original product code numbers (or "finished good number"). All SBUs in the company may use this tracking system to locate product and determine the amount on-hand or in the shipping pipeline, these activities are widely known as MPS (Materials Production Scheduling).

Preferably, the numbering system discussed below and used for the raws and packaging components tracking is translated into warehouse locations further improving the efficiency of the system according to the present invention by reducing duplicative, ancillary numbering systems and mirror code number systems.

Distribution/Receiving

Referring now to FIG. 12, an examplematic Bill-of-Lading which has been automatically generated is illustrated therein. The product code number generated by Marketing and in use by all SBUs is now used to create a shipping bill. The sales information is preferably automatically included from the sales sheet of the Sales Layer, showing the customer's name, location, and any specific or unusual shipping instructions.

By using automatic tracking and document generation, such as the bill-of-lading 1200, just-in-time shipping can be more easily implemented, as the tracking system, as discussed below, enables reliable tracking of every raw material, packaging component, artwork and order for each product, for example.

Basically, the idea is to create one electronic document that will be built upon by each, subsequent SBU. This will alleviate duplication of work and inefficient interaction of SBU's communicating via different software hard copies. After the first document is generated, the Bulletin 10 by Marketing, each subsequent layer is completed by manually inputting required information into blank fields of that layer's template which was automatically populated with relevant information from other layers which was available. This takes advantage of the realization that various SBUs which interact later in the product development process may have little data to enter since the previous SBUs may have filled in much of the information. For instance, Manufacturing's Work Order can now be completed early in the process. Also, each SBU will be able to view all layers if necessary but only the group responsible for their area may be able to modify their area if desired. Several attachments may be added to each layer as needed. These attachments will be from "standard" software used by SBUs today, such as AutoCAD in Packaging, J D Edwards in Logistics, Illustrator in Marketing, etc.

Additionally, links can be easily provided for any item in the system (i.e. data element, attachment) which, upon activation accesses another document, which may be within or outside of the system. For example, each vendors name may be provided with an HTTP link to the particular vendors website, which may provide for order tracking. In this way, the system is dynamically updated each time the vendor updates his website, as a user clicking on the link will receive the most current data available without requiring duplicative data entry. Additionally, the system in this way can be easily and dynamically enlarged in scope and updated simply by providing new links to appropriate documents or webpages for example.

Using a united system enables companies to consolidate. Individuals may be eliminated in the process since one person may be able to handle several different functions; one individual may create Packaging Component Specifications, Bills-of-Material, and Purchase Orders. In contrast, conventional methods require three individuals to do these jobs. The level of efficiency is improved because a single, compatible approach is utilized instead of today's fragmented method. Everything starts with the Bulletin 10; a consumer product company's core document. The Bulletin 10 is translated directly into a R&D profile, Packaging Profile, then into a Logistics Bill-of-Material, and finally into a Manufacturing Work Order. All other documents are ancillary and can be easily attached to the core layers as required. One core document to be used by all SBUs is a distinct advantage in handling data management. Utilizing existing software technologies and integrating them into this new "total" package will provide added benefits as well. New training will not be required and many current systems in use by many companies may be continued. The core document being used by all SBUs and the ability to attach ancillary documents, suitable to each SBU, to the core document are the keys to this software. Further, many consumer product companies may act as "Virtual" companies where this software may be used to manage outside vendors and consultants. The host company may "farm out" all work by a core management team overseeing all work with the use of this software. Improved management may be enacted, as in inventory control, with this software. This of course is consistent with modern cost-savings and value analyses which are very important to company efficiency. "Value-Analyses" and improved decision making are an inherent advantage of the instant system.

Tracking

According to the instant system, it now becomes possible to eliminate SBU specific and inconsistent tracking numbers, a significant drawback that was heretofore unavoidable. The new identification and tracking scheme is illustrated in FIG. 13. Therein, a general format 1300 for tracking numbers (preferably each of which is automatically generated and each element of which is automatically assigned by the system) according to the present invention is illustrated.

Referring more particularly to the tracking scheme 1300A, it is seen to include a base portion 1340 (XXXXXX) which is the base of product code 20. In the specific case of FIGS. 1–12, 100200. Element 1350 (YY) designates slight variations of the base product code 1330. For example, 0.01 in FIG. 1 could specify product 100200 which is designated for market in the United States, while 0.02 specifies product which is designated for an international market (100200.01=20, 100200.02=20'). According to the present invention the base code identification number 1340 and variation number 1350 are duplicated in each raw and component ID, shipping tracking number, and every other individual identification for anything associated with this product as will be set forth.

Referring again to FIG. 13, element 1310A (A, C or V) can take the form of either an "A", "C" or "V" according to a preferred form of the instant invention, depending upon whether the particular item being identified is associated with artwork, or artwork vendors, (A), a customer (C) or a vendor (V). Element 1320 (VVVV) identifies a particular artist or artwork company, customer and location or vendor depending upon element 1310A. Element 1330A (WWW) identifies particular order numbers or revisions as will be set forth. Element 1360A (P or R) is used in conjunction with a "V" in element 1310A to indicate whether each particular identification 1300A relates to a raw ("R") or packaging component ("P"). Element 1370A (ZZZZ) identifies the name (see, 510 and 610) of the item associated with the identification 1300A (i.e. $H_2O$, bottle), while element 1380 (AAAA) generally identifies which particular item of that class or name is associated with that identification number (i.e. which water or bottle in the raws and components database for example).

Still referring to FIG. 13, identification 1300B illustrates an identification number according to the present invention. Element 1310B illustrates that it relates to art work. Element 1320B illustrates that it relates to artist or artwork vendor 0001. Element 1330B indicates that it relates to revision number 1. Element 1340B indicates that it is related to product code number 100200. Element 1350B illustrates that it is associated with variation 01, for example, for sale in the United States.

Referring now also to identification 1300C, it illustrates another identification number according to the present invention. Element 1310C illustrates that this identification number is associated with a customer. Element 1320C indicates that this number is associated with the customer 0001. Element 1330C indicates that this is the first order for product number 100200.01 from customer 1320C for item 1340C, 1350C.

Referring now also to identification 1300D, element 1310D indicates that this identification number is associated with a vendor, while element 1320D illustrates that it is associated with vendor number 0001. Element 1330D illustrates this is the first purchase order which has been issued for this item. Again, element 1340D and 1350D illustrate the product with which this packaging component is associated with. Element 1360D illustrates that this is a packaging component, while element 1370D illustrates the class or general type of the item to which this purchase order refers to (see element 510 or 610, as they relate to the raws and packaging databases). Finally, element 1380D indicates that it is particularly packaging component AAAA of item class 1370D (again referring to the raws and packaging components databases). In this way, referring only to identification 1300D, one can readily ascertain that this number is associated with a purchase order from vendor 0001, that it is the first purchase order for this item as it relates to product 100200.01 and that it is a packaging component of type 0001, and specifically that as is designated AAAA in the packaging components database.

Referring finally to identification 1300E, it similarly represents an identification number for a purchase order (1310E) relating to raw material (1360E) AAAA (1380E) which is within classification 001 (1370E) for product 100200.01 (1340E, 1350E) from vendor 0002 (1320E). Again, referring to 1330E, one can also ascertain that this is the first purchase order from vendor 0002 relating to raw material AAAA of type 001 (see 1380E and 1370E) for product 100200.01. This number system may of course be tailored to the specific host company and their specific needs. For vendor number V0001 and supply order number 001. Alternatively, V0001 may indicate generally the vendor's name, while .001 indicates the specific location of that vendor. However, it should be recognized that regardless of the specific implementation of this system, it remains readily ascertainable from any identification number for any product, raw material, packaging component, or other item associated with the product, including any piece of paperwork, to determine to what product it relates, at any stage of bringing the product to market through the use of element 1340A and 1350A, for example. For example, if a same packaging component is to be bought three times from a same vendor for the same product, the following purchase order numbers could be used, which would readily allow receiving dock personnel easily ascertain to which product they relate without having to lookup otherwise appearingly random purchase order number.

V0001.001.100200.01.P0001.AAAA
V0001.002.100200.01.P0001.AAAA
V0001.003.100200.01.P0001.AAAA

From this it becomes readily ascertainable that each of these products relate to item number 100200.01, that they are packaging components, type AAAA of Class 0001 and from which vendor they originated.

Further, different SBUs may look at only portions of an entire number in order to determine the information that they seek. For example, if artwork would like to get a copy of a bottle for which the artwork will be applied to, they simply need to find the product number 1340A, for example, and look to the right in these particular embodiments to find element 1360A, which includes a P and element 1370A including that designation for a bottle, for example, 0001. Further, Sales may only be interested in who is buying a particular product, in such a case they need only look to the product identification 1340A and 1350A and to the left thereof. For example, 1310A including a C and 1320A indicating which client it is. Similarly, marketing may only be looking to see what revisions have been made to the artwork for a particular product. Accordingly, they need only look at the core product identification 1340A, and variation 1350A, and find to the left of thereof, element 1310A which includes an A. Element 1330A then clearly indicates a revision number. Similarly, as elements 1360A through 1380A are preferably entered into the raws and package components databases, Quality Assurance can readily simply enter these numbers into the databases to determine proper testing, procedures therefore, without having to do a separate consultation with R&D or Packaging.

Additionally, consultants can simply be designated as vendors in the system and hence also be tracked.

The numbering system itself provides a built-in system for all SBU's to immediately and easily evaluate their activities and therefore applicable business decisions can be made on trends shown through the numbering system thus increasing efficiency once again. The unique identifiers in the numbering system automatically provided by the database(s) enables rapid organization of all data associated with the product to be correlated in any way which would be beneficial to any SBU, as all information is now automatically shared and dynamically updated.

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

For example, other data or data documents may be added to any layer. Specific data of particular use to a specific SBU may be added to appropriate layers. The system according to the present invention is adjustable and customizable, in other words it can be tailored to a specific industry or individual company for example. New fields can be added or some taken away throughout the various layers. Because the system is dynamic, each SBU's performance is improved, as current information is always available to them. The information automatically generated and duplicated on the individual layers is intended to be tailored to each specific industry and/or business for example (fragrance, cosmetic, personal-care, health-care, pharmaceutical, food, beverage, snack, confectionery, electronics, hardware, chemical, toys, etc.) Other layers corresponding to other SBUs or departments could be added, or some combined or deleted depending upon the individual preference of the implementers. Technical Service and/or Engineering databases/layers/user interfaces may be added as examples. The sign-offs or authorizations of the various layers can be utilized for tracking as well. Original and revision sign off dates can be stored in the system and used to prompt users for explanations of actions, for example why revisions were made. Basically, the unique identifiers in the numbering system provide automatically databases for artwork/artwork vendors, customers, vendors, including consultants. The databases are based-on/arranged by the specific numbering system. And, this system allows for optimum compilation of information and data based decision making on any facet of the business.

I claim:

1. A data management system for use in a consumer product development process, said system comprising:

a computing device having a memory;

a plurality of databases for a plurality of business units involved in the product development process, said databases linked through a computer network;

an application program to interface with a user to retrieve initial product information selected from a product description, a target product cost, a target product sales price, a product type, a packaging type, packaging component information, a periodic sales forecast, a product development budget, and any combination thereof, to thereby produce a first product record in one of the plurality of databases;

a sharing engine for interacting with each database to generate product records for each database using product information from the first product record, wherein each of the product records is organized by requirements from the database of the business unit for which the product record is generated;

means for automatically duplicating and dynamically updating said product information entered by said business units into one of said plurality of databases in others of said plurality of databases thereby eliminating duplicative data entry by said business units during different stages of development of said product, wherein said plurality of business units enter and update product information into their respective databases concurrently and independently of other business units entering and updating product information into their databases; and a tracking system for tracking said development of said product, said tracking system including unique identifiers for said product and said product information associated with said business unit, wherein said unique identifiers associated with said product information further identify said product.

2. A computerized system for aiding in developing a product, which product development requires completing a plurality of sets of tasks by a plurality of business units, said tasks including at least developing said product, developing packaging for said product and marketing said product, wherein information utilized to complete at least one of said plurality of sets of tasks is utilized to complete at least another of said plurality of sets of tasks, said system comprising:

a plurality of user interfaces each respectively associated with one of said plurality of sets of tasks and adapted to assist a user of a business unit to complete said associated set of tasks;

means for automatically duplicating and dynamically updating product information entered by said business units into one of said user interfaces in others of said plurality of user interfaces thereby eliminating duplicative data entry by said business units during different stages of development of said product, wherein said plurality of business units enter and update product information into their respective interfaces concurrently and independently of other business units entering and updating product information into their interfaces;

at least one database accessible from at least one of the user interfaces and for storing data relating to packaging components and raw materials, wherein select packaging components and raw materials are associated with said product; and a tracking system for tracking said development of said product, said tracking system including unique identifiers for said product, said select packaging components and said select raw materials, wherein said unique identifiers associated with said select packaging components and raw materials further identify said product.

3. The system of claim 2, wherein said select information includes said unique identifier associated with said product and said unique identifiers for said packaging components are automatically generated using a packaging component database and said unique identifiers for said raw materials are automatically generated using a raw material database.

4. The system of claim 3, wherein each of said plurality of user interfaces is associated with one of: marketing tasks, sales tasks, financing tasks, packaging development tasks, engineering tasks, product development tasks, logistics tasks, purchasing tasks, receiving tasks, quality assurance tasks, manufacturing tasks and distribution tasks.

5. The system of claim 4, wherein each of said user interfaces includes means for accessing additional information related to said set of tasks associated therewith upon activation.

6. The system of claim 5, wherein said means for accessing comprises a hypertext protocol link.

7. The system of claim 2, wherein said unique identifier for each of said select packaging components includes:

a first portion which identifies it as being assigned to a packaging component;

a second portion which uniquely identifies said product;

a third portion which identifies a type of packaging component which it is assigned to; and, a fourth portion which uniquely identifies the packaging component which it is assigned to from all other packaging components of the same type.

8. The system of claim 7, wherein said unique identifier for each of said select raw materials includes:

a first portion which identifies it as being assigned to a raw material;

a second portion which uniquely identifies said product;

a third portion which identifies a type of raw material which it is assigned to; and, a fourth portion which uniquely identifies the raw material which it is assigned to from all other raw materials of the same type.

9. The system of claim 2, wherein said tracking system further includes unique identifiers for each of a plurality of pieces of artwork or artwork vendors, vendors and suppliers including consultants to assist developing said product, and wholesale or retail customers for said product, select ones of said pieces of artwork, vendors and suppliers being associated with said product, wherein:

said unique identifiers for said select pieces of artwork further identify said product and at least one of said unique identifiers for said select pieces of artwork further identifies at least one of said artwork vendors or consultants;

each of said unique identifiers for said select packaging components further include said unique identifier for a respectively associated one of said select vendors and suppliers; and, each of said unique identifiers for said select raw materials further include said unique identifier for a respectively associated one of said select vendors and suppliers.

10. The system of claim 2, wherein said tracking system further includes unique identifiers for orders received, wherein select ones of said orders received are orders for said product, and said unique identifiers associated with said select orders further identify said product.

11. The system of claim 2, wherein:

said tracking system further includes unique identifiers for orders received, wherein select ones of said orders received are orders for said product, and said unique identifiers associated with said select orders further identify said product, wherein said unique identifier for each of said select orders includes: a first portion which identifies it has been assigned to an order; a second portion which identifies said product; a third portion which identifies a customer associated with said order; and, a fourth portion which uniquely identifies the order to which it has been assigned from all other orders for said product; wherein said third portion is automatically generated using a customer database which includes information regarding a plurality of customers; and, said tracking system further includes unique identifiers for pieces of artwork, wherein select ones of said pieces of artwork are associated with said product, and said unique identifiers associated with said select pieces of artwork are automatically generated using a database including information regarding a plurality of pieces of artwork and further identify said product, wherein said unique identifier for each of said select pieces of artwork includes: a first portion which identifies it as being associated with a piece of artwork; a second portion which identifies said product; a third portion which identifies an artwork vendor associated with said product or a company developing said product; and, a fourth portion which uniquely identifies the piece of artwork to which it has been assigned from all other of said plurality of pieces of artwork; wherein said third portion is automatically generated using an artwork vendor database which includes information regarding a plurality of artwork vendors.

12. A computerized method for aiding in developing a product, which product development requires completing a plurality of sets of tasks by a plurality of business units, said tasks including at least developing said product, developing packaging for said product and marketing said product, wherein information utilized to complete at least one of said plurality of sets of tasks is utilized to complete at least another of said plurality of sets of tasks, said method comprising:

providing a plurality of user interfaces each respectively associated with one of said plurality of sets of tasks for developing said product and having a display and user interface adapted to assist a user of a business unit to complete said associated set of tasks;

automatically duplicating and dynamically updating product data entered by said business units using one of said user interfaces of said plurality of user interfaces in others of said plurality of user interfaces thereby eliminating duplicative data entry by said business units during different stages of development of said product;

wherein said plurality of business units enter and update said product data into their respective databases concurrently and independently of other business units entering and updating product data into their databases; and providing at least one database for tracking packaging components and raw materials, said database being accessible from and responsive to at least one of said user interfaces;

associating selected ones of said packaging components and raw materials with said product; and automatically assigning a unique identifier to each of said product, said packaging components and said raw materials, wherein said unique identifiers associated with said select packaging components and said select raw materials further include said unique identifier associated with said product.

13. The method of claim 12, wherein said select data includes said unique identifier associated with said product.

14. The method of claim 13, wherein each of said plurality of user interfaces is associated with one of: marketing tasks, sales tasks, financing tasks, packaging development tasks, product development tasks, engineering tasks, logistics tasks, purchasing tasks, receiving tasks, quality assurance tasks, manufacturing tasks and distribution tasks.

15. The method of claim 14, further comprising: providing means for accessing additional information related to development of said product upon activation of at least one of said user interfaces.

16. The method of claim 12, wherein said unique identifier for each of said select packaging components includes:

a first portion which identifies it as being assigned to a packaging component;

a second portion which includes said unique identifier for said product;

a third portion which identifies a type of packaging component which it is assigned to; and, a fourth portion which uniquely identifies the packaging component which it is assigned to from all other packaging components of its type.

17. The method of claim 16, wherein said unique identifier for each of said select raw materials includes:

a first portion which identifies a raw material to which it is assigned;

a second portion which includes said unique identifier for said product;

a third portion which identifies a type of raw material which it is assigned to; and, a fourth portion which uniquely identifies the raw material it is assigned to from all other raw materials of the same type.

18. The method of claim 17, further comprising: automatically assigning unique identifiers for pieces of artwork or artwork vendors, select ones of said pieces of artwork being associated with said product, wherein said unique identifiers for said select pieces of artwork include said unique identifier for said product.

19. The method of claim 18, further comprising automatically assigning unique identifiers for orders received, wherein select ones of said orders received are orders for said product, and wherein said unique identifier for each of said select orders includes:

a first portion which identifies it as being assigned to an order;

a second portion which includes said unique identifier for said product;

a third portion which identifies a customer associated with said order; and, a fourth portion which uniquely identifies the order to which it has been assigned from all other orders for said product.

20. A computer-implemented method for tracking a product development process by a plurality of business units, said computer-implemented method comprising the steps of:

automatically assigning by a computer processor a unique identifier to each of a plurality of products to be developed;

associating each of a plurality of packaging components with one of said products;

automatically assigning by a computer processor each of said packaging components a unique identifier dependent upon the unique identifier of said associated product;

associating each of a plurality of raw materials to one of said products;

automatically assigning by a computer processor each of said raw materials a unique identifier dependent upon the unique identifier of said associated product;

receiving from at least one business unit through at least one interface a plurality of orders each for one of said plurality of products, wherein each of said unique identifiers are automatically duplicated and dynamically updated on a corresponding one of said plurality of orders, and wherein said plurality of business units enter and update product information associated with said unique identifiers concurrently and independently of other business units entering and updating product information; and automatically assigning by a computer processor each of said orders a unique identifier dependent upon the unique identifier of the one of said products each order is for.

21. The method of claim 20, wherein:

said unique identifier for each of said select packaging components includes: a first portion which identifies it as a packaging component; a second portion which includes said unique identifier for said associated product;

a third portion which identifies a type of packaging component which it is; and, a fourth portion which uniquely identifies it from all other packaging components of its type;

said unique identifier for each of said select raw materials includes: a first portion which identifies it as a raw material; a second portion which includes said unique identifier for said associated product; a third portion which identifies a type of raw material which it is; and, a fourth portion which uniquely identifies it from all other raw materials of its type; and, said unique identifier for each of said select orders includes: a first portion which identifies it as an order; a second portion which includes said unique identifier for said associated product; a third portion which identifies a customer associated with said order; and, a fourth portion which uniquely identifies it from all other orders.

* * * * *